Nov. 4, 1924.

P. ARCHER 1,514,122

ANNEALING BOX FOR LENSES OR THE LIKE

Filed May 29, 1923

Inventor
Plato Archer

By F. H. Bryant
Attorney

Patented Nov. 4, 1924.

1,514,122

UNITED STATES PATENT OFFICE.

PLATO ARCHER, OF JEANNETTE, PENNSYLVANIA.

ANNEALING BOX FOR LENSES OR THE LIKE.

Application filed May 29, 1923. Serial No. 642,259.

*To all whom it may concern:*

Be it known that I, PLATO ARCHER, a citizen of the United States of America, residing at Jeannette, in the county of Westmoreland and State of Pennsylvania, have invented certain new and useful Improvements in Annealing Boxes for Lenses or the like, of which the following is a specification.

This invention relates to certain new and useful improvements in annealing boxes for lenses or the like and has particular reference to a box adapted to contain a plurality of glass plates or lenses in spaced relations during annealing thereof.

The primary object of the invention resides in the provision of a box structure adapted to support headlight lenses or the like in spaced relations in a manner to protect the same from drafts or sudden temperature changes during annealing to eliminate cracking or warping of the glass plates during treatment.

A further object of the invention is to provide a supporting box structure for lenses during annealing, reducing the cost of production and increasing the quantity output.

With the above and other objects in view as the nature of the invention is better understood, the same consists of the novel form, combination and arrangement of parts hereinafter more fully described, shown in the accompanying drawing and claimed.

Figure 1:
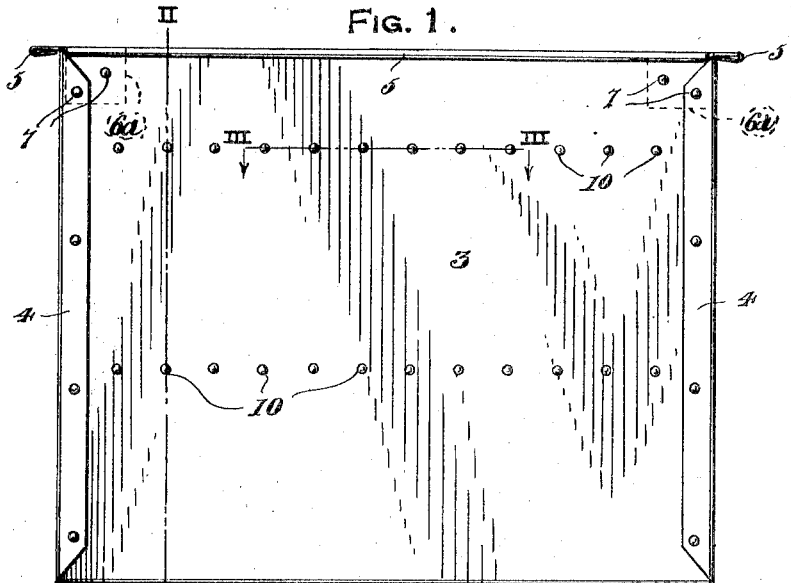
Figure 2:
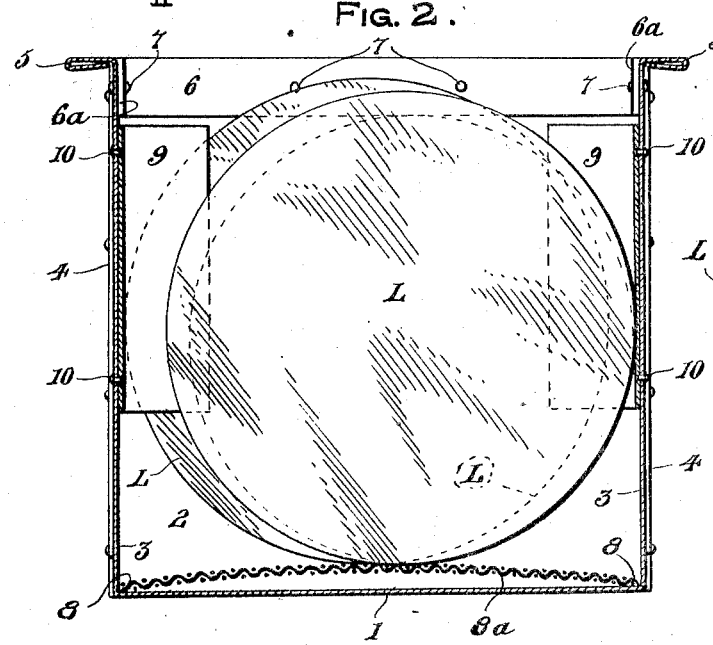
Figure 3:
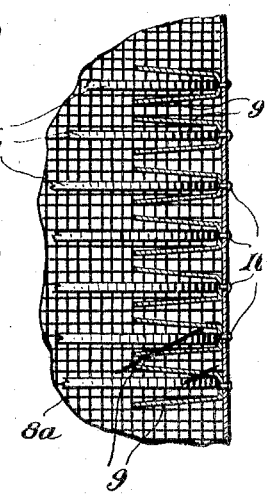

In the drawing, wherein like reference characters designate corresponding parts throughout the several views, Figure 1 is a side elevational view of an annealing box for lenses constructed in accordance with the present invention, Figure 2 is a vertical cross sectional view taken on line II—II of Fig. 1 showing the cushioned bottom for supporting the lenses and the spacer members within the box, and Figure 3 is a detail sectional view taken on line III—III of Fig. 1, showing the spacer members secured to the side walls of the box and a lens associated with each spacer member.

In the art of manufacturing glass plates, such as lenses for automobile headlights, it has heretofore been customary to mold the lens in a press into the desired configuration, after which the mold sections were separated and the lens removed therefrom and placed upon a tray to be transferred to the movable pan of a leer for annealing purposes. In the method heretofore practiced, the lens were flatly laid upon a tray, and in some instances a second lens subsequently removed from the mold was mounted directly upon the previously molded lens. In many instances, the first lens has become so chilled that the placing of a second lens directly from a mold thereon, causes the first lens to be cracked and a warping of the second heated lens. This method further necessitates considerable help and expense, three men actually being required to transfer the lenses from the molds to the leer pan in an attempt to place the lenses into the leer before the heat has passed therefrom. The old method working upon a time basis of four hours and fifteen minutes accomplishes the approximate molding of four hundred fifty lenses, and after the lenses have been annealed, it has been found that seldom more than two hundred thereof are capable of use or sale, the majority thereof breaking and becoming warped or distorted and consequently rendered useless.

The present invention employing a box structure that is heated prior to the placing therein of a plurality of lenses, preferably twelve, eliminates the deficiencies of the old method, the lens being stacked in the box in vertical relations and spaced from each other and transferable as a unit to the movable pan of the leer, only one man being required to handle the output of two presses, whereas heretofore, three men were required for each press.

In the accompanying drawing showing the preferred form of the invention for carrying the above noted objects into effect, there is illustrated a box comprising a flat bottom wall 1, perpendicular end walls 2 and side walls 3 with a lap joint 4 at the vertical corners of the box as shown in Figure 1. The upper edges of the side and end walls 2 and 3 are bent outwardly and backwardly upon themselves to form lateral flanges 5 facilitating handling of the box, the upper endge being reinforced by the inwardly positioned strips 6 secured as at 7 to the end walls 2 with opposite ends thereof angularly bent as at 6ª for flat engagement with the upper ends of the side walls 3 and secured thereto as at 7ª.

To cushion the lenses placed in the box, a false bottom 8, preferably formed of wire mesh is placed therein and is arched upwardly toward the center of the box at 8ª to provide a shock absorbing cushion for the lenses L dropped into the box.

The lenses L are preferably supported in vertical positions within the box and spaced from each other by substantially V-shaped partitions having the closed portions of the side legs 9 rivited or otherwise secured as at 10 to the side walls 3 as clearly shown in Figs. 2 and 3, the side legs 9 of the partitions flaring outwardly as shown in Fig. 3 to permit easy placing of the lens in position. A saving of material is noted by positioning the partitions adjacent the upper ends of the box with the lower ends thereof terminating considerable distances above the bottom wall 1 as shown in Fig. 2.

In the use of the annealing box disclosed in this application, the lenses are removed from the molds and placed in the box in spaced relations by the partitions 9 as shown in Fig. 3, the box being previously heated so that the lenses L will not crack when placed in contact therewith, the dropping of the lenses into the box being cushioned by the false bottom 8 as shown in Fig. 2. One man is capable of handling the output of two presses, and when a box has been filled with the desired number of lenses, twelve in this instance, the same is transferred to the traveling pan of a leer to effect annealing of the lenses in the usual manner. By arranging the lenses in vertical relations, warping thereof is eliminated, and by building the side and end walls of the box of the desired height, the heated lenses are protected from drafts and cracking thereof prevented. The boxes are of such size as to permit approximately eight or ten each carrying a dozen lenses being mounted upon a single leer pan for taveling through the leer, economizing in space and time as will at once be obvious. This device having been actually reduced to practice, only one or two lenses were found to be faulty in the handling of a group allotment of approximately one thousand lenses, and when compared with the old method of annealing lenses, the present method of handling the same during the annealing operation should at once be appreciated.

While there is herein shown and described the preferred embodiment of the present invention, it is nevertheless to be understood that minor changes may be made therein without departing from the spirit and scope of the invention as claimed.

What is claimed as new is:—

1. In an annealing box for lenses, a box structure constructed to support a plurality of lenses in vertical spaced relations and cushioning means for the lenses associated with the bottom of the box structure.

2. In an annealing box for lenses, a box structure constructed to support a plurality of lenses in vertical spaced relations and a shock absorbing false bottom for the box adapted to be engaged by the lenses.

3. In an annealing box for lenses, a box structure, and vertical partitions carried by opposite sides of the box to support opposite edges of lenses and retain the lenses in spaced relation during annealing.

4. In an annealing box for lenses, a box structure, vertical partitions carried by opposite sides of the box to support opposite edges of lenses and retain the lenses in spaced relation during annealing, outwardly directed flanges carried by the upper edge of the box, and means for reinforcing the upper edges.

5. In an annealing box for lenses, a box structure, vertical partitions carried by opposite sides of the box to support opposite edges of lenses and retain the lenses in spaced relation during annealing, outwardly directed flanges carried by the upper edge of the box, means for reinforcing the upper edges, and a reticulated shock absorbing structure supported within the lower end of the box.

In testimony whereof I affix my signature.

PLATO ARCHER.